(12) United States Patent
Gschwind et al.

(10) Patent No.: US 11,550,777 B2
(45) Date of Patent: Jan. 10, 2023

(54) DETERMINING METADATA OF A DATASET

(71) Applicant: International Business Machines Corporation, Armonk, NY (US)

(72) Inventors: Thomas Gschwind, Zurich (CH); Christoph Adrian Miksovic Czasch, Zurich (CH); Paolo Scotton, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 16/941,565

(22) Filed: Jul. 29, 2020

(65) Prior Publication Data
US 2022/0035792 A1 Feb. 3, 2022

(51) Int. Cl.
G06F 16/20 (2019.01)
G06F 16/23 (2019.01)
G06F 16/2455 (2019.01)

(52) U.S. Cl.
CPC .... G06F 16/2379 (2019.01); G06F 16/24558 (2019.01)

(58) Field of Classification Search
None
See application file for complete search history.

(56) References Cited

U.S. PATENT DOCUMENTS

| | | |
|---|---|---|
| 8,126,892 B2 | 2/2012 | Chakravarthy |
| 9,251,180 B2 | 2/2016 | Deshpande |
| 9,535,902 B1 | 1/2017 | Michalak |
| 2015/0294018 A1* | 10/2015 | Lu ........... G06F 16/3322 707/730 |
| 2017/0171580 A1* | 6/2017 | Hirsch ............ H04W 4/24 |
| 2020/0013077 A1* | 1/2020 | Garlapati ........ G06Q 30/0203 |
| 2021/0192203 A1* | 6/2021 | Ren ............ G06F 16/137 |

FOREIGN PATENT DOCUMENTS

WO WO-2020222202 A1 * 11/2020 ............ G06F 40/211

OTHER PUBLICATIONS

Huynh, "Entity Extraction from Unstructured Data on the Web," Journal of the Association for Information Systems, Dec. 2014, 153 pages. <https://espace.library.uq.edu.au/view/UQ:347234/s42400703_phd_submission.pdf>.

Minton et al., "A Heterogeneous Field Matching Method for Record Linkage," Fifth IEEE International Conference on Data Mining (ICDM'05), Nov. 27-30, 2005, 8 pages, <https://usc-isi-i2.github.io/papers/minton05-icdm.pdf>.

* cited by examiner

Primary Examiner — Jau Shya Meng
(74) Attorney, Agent, or Firm — Grant M. McNeilly

(57) ABSTRACT

The present disclosure relates to a method for enabling a processing of a dataset of records having a set of attributes. The method comprises: selecting a first attribute of the set of attributes and a subset of one or more second attributes of the set of attributes. Distinct values of the subset of second attributes may be determined from the dataset. For each distinct value of the determined distinct values records of the dataset that have said each distinct value may be identified, and a group of words may be formed from values of the first attribute of the identified records. Distinct word sequences may be identified in the formed groups and a level of presence of each word sequence of the word sequences in each of the formed groups may be determined. At least part of the levels of presence may be provided as metadata.

20 Claims, 6 Drawing Sheets

DETERMINING METADATA OF A DATASET

BACKGROUND

The present invention relates to the field of digital computer systems, and more specifically, to a method for generating metadata of a dataset.

Record linkage can be performed to link elements of a source dataset to related data items of a target dataset. Typically, the source dataset may be structured or unstructured whereas the target dataset may typically be structured. If both datasets are structured, attributes of the same type may be compared with each other. However, if one dataset is unstructured, it may comprise a limited number of attributes values. For example, an unstructured dataset may comprise a company name but no other specific attribute values such as the industry it belongs to or its geo-location. This may render difficult the record linkage between the datasets.

SUMMARY

Various embodiments provide a method for generating metadata of a dataset, computer system and computer program product as described by the subject matter of the independent claims. Advantageous embodiments are described in the dependent claims. Embodiments of the present disclosure can be freely combined with each other if they are not mutually exclusive.

In one aspect, the disclosure relates to a method for enabling a processing of a dataset of records having a set of attributes. The method comprises: selecting a first attribute of the set of attributes and a subset of one or more second attributes of the set of attributes; determining from the dataset distinct values of the subset of second attributes; for each distinct value of the determined distinct values: identifying records of the dataset that have said each distinct value, and forming a group of words from values of the first attribute of the identified records; identifying distinct word sequences in the formed groups, each word sequence comprising one or more words, and determining a level of presence of each word sequence of the word sequences in each of the formed groups; and storing at least part of the levels of presence.

In another aspect, the disclosure relates to a computer program product comprising a computer-readable storage medium having computer-readable program code embodied therewith, the computer-readable program code configured to implement all of the steps of the method according to preceding embodiments.

In another aspect, the disclosure relates to a computer system for enabling a processing of a dataset of records having a set of attributes. The computer system is configured for: selecting a first attribute of the set of attributes and a subset of one or more second attributes of the set of attributes; determining from the dataset distinct values of the subset of second attributes; for each distinct value of the determined distinct values: identifying records of the dataset that have said each distinct value, and forming a group of words from values of the first attribute of the identified records; identifying distinct word sequences in the formed groups, each word sequence comprising one or more words, and determining a level of presence of each word sequence of the word sequences in each of the formed groups; and storing at least part of the levels of presence.

The stored at least part of the levels of presence may be provided as metadata of the dataset. For example, the at least part of the levels of presence may be stored in association with the dataset. The present subject matter may provide the levels of presence as content metadata in order to support update operations and content acquisition and processing of the dataset. The metadata may serve to control the operation of the computer system, e.g. by selectively processing the dataset using additional attribute information generated from the metadata and assigned to received records. The metadata may comprise or reflect the technical nature of the stored dataset. The metadata may subsequently be used to improve algorithms such as an entity matching algorithm. The present subject matter may not require additional background data as it identifies from the dataset at hand a corpus of words that are indicative of other attributes of an entity, such as its industry or location. The present subject matter may improve the capability to retrieve, for example, through a search or scan, data that best match an entity profile and context. The data search can be performed by exploiting the metadata.

BRIEF DESCRIPTION OF THE SEVERAL VIEWS OF THE DRAWINGS

In the following embodiments of the disclosure are explained in greater detail, by way of example only, making reference to the drawings in which.

DETAILED DESCRIPTION

Figure 1:
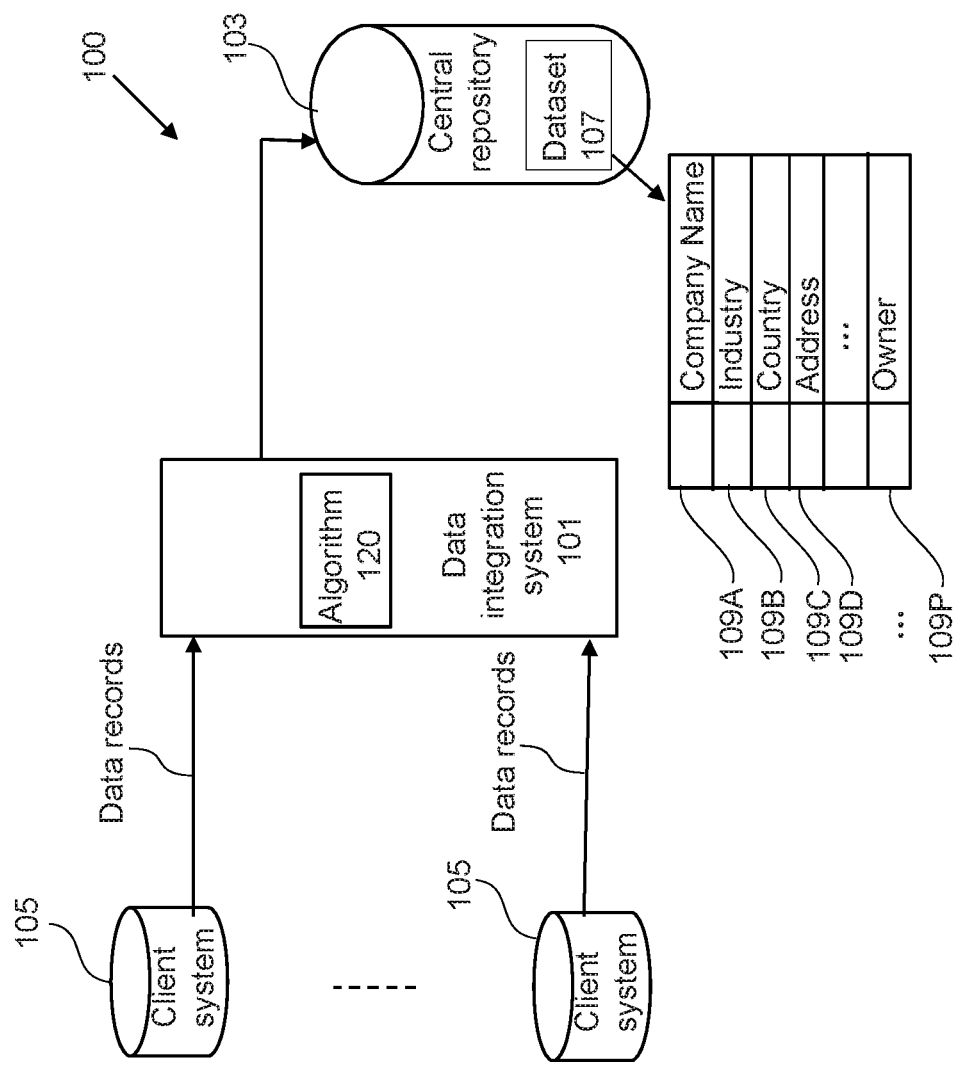
FIG. 1 is a block diagram of a computer system in accordance with an embodiment of the present disclosure.

The descriptions of the various embodiments of the present disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A dataset is a collection of one or more data records. For example, the dataset may be provided in the form of a collection of related records contained in a file, e.g. the dataset may be a file containing records of all students in a teacher's class. The dataset may, for example, be a table of a database or a file of a Hadoop® file system, etc. In another example, the dataset may comprise one or more documents such as an HTML page or other document types. The document may, for example, comprise data of a company.

A data record or record is a collection of related data items such as a name, date of birth and teacher of a particular user.

A record represents an entity, wherein an entity refers to a user, object, or concept about which information is stored in the record. The terms "data record" and "record" are interchangeably used. The data records may, for example, be stored in a graph database as entities with relationships, where each record may be assigned to a node or vertex of the graph with properties being attribute values such as name, date of birth, etc. The data records may, in another example, be records of a relational database.

The dataset may, for example, be stored in a central repository. The computer system may be configured to access the central repository, e.g. the central repository may or may not be part of the computer system. The central repository may be a data store or storage that stores data received from multiple client systems. The dataset may comprise a subset of existing records of the central repository that are identified or selected in order to be processed by the present method. The subset of records may, for example, be selected based on values of one or more attributes of the records, e.g. the subset of records may represent entities belonging to a given country or region. The records of the dataset may, for example, be pre-processed before being processed by the present method. The pre-processing may, for example, comprise transforming the format of the attribute values of the records of the dataset. For example, attribute values may be uppercased, their noise characters (such as "-", "." or "/") may be removed and anonymous attribute values (such as city=nowhere or first name=Test) may be removed.

The term "word" as used herein may be a sequence of characters, wherein a character may be a number, a letter or any special character. The word sequence may be a sequence of one or more words.

According to one embodiment, the method further comprises: receiving a matching request. The matching request comprises a record having a certain value of the first attribute and having or not having values for one or more attributes, called hereinafter missing attributes, of the subset of second attributes. A word sequence may be generated from the certain value, and the levels of presence corresponding to the generated word sequence may be identified in the provided metadata. The group associated with the highest identified level of presence of the identified levels of presence may be determined. The distinct value of the subset of second attributes associated with the determined group may be used for determining missing values of the missing attributes. The determined missing values may be associated with the received record by, for example, inserting them in the received record, resulting in a modified (or completed) record. A missing attribute that is added to the received record may be referred to as a synthetic attribute. The modified record may be compared with records of the dataset. The result of the comparison may be provided. The missing attribute as used herein may be an attribute of a given record for which a value is estimated or determined in accordance with the present subject matter. The given record may or may not have a (original) value of the missing attribute. The given record may, for example, have attributes a1, a2 and a3, wherein attribute a3 may be the missing attribute (or synthetic attribute). Regardless of the fact that attribute a3 has or has not a value, the present subject matter may be applied such that an estimated value of the attribute a3 is provided in addition to the original value of a3 or provided as a single value of the attribute a3 if the attribute a3 does not have an original value.

The result of the comparison may, for example, indicate one or more records of the dataset that match the modified record. If the one or more records have at least one missing attribute of the missing attributes, they may be completed with synthetic attributes in a similar way as described with the received record. The resulting completed records may further be compared with the modified record in order to refine the comparison and to detect the most similar records.

Matching of records comprises comparing attribute values of the records. For example, if the records comprise a set of attributes a1 to an, the comparison between two records is performed by comparing the n pairs of values of the attributes a1 to an respectively. The comparison between two or more records may thus result in n individual similarity levels indicative of the level of similarity of the values of the respective attributes a1 to an. The individual level of similarity of an attribute (e.g. a1) may be obtained by performing one or more word comparisons, wherein each word comparison is performed between a word sequence of the attribute a1 in the compared record with another word sequence of the attribute a1 in the other compared record. For example, attribute a1 in a first record has word sequences w1 and w2 and the attribute a1 has word sequences w3 and w4 in the other record. The word sequences w1, w2, w3 and w4 may be associated with respective contribution weights wg1, wg2, wg3 and wg4 in order to perform the comparison. The comparison of a1 of the two records may comprise the following four-word comparisons: w/with w3, w1 with w4, w2 with w3 and w2 with w4. The four comparisons may result in these word level similarities r13, r14, r23 and r24 respectively. Each of the four-word level similarities may be weighted with a contribution weight associated with the respective word sequences. For example, the word level similarity r13 may be weighted as follows: wg1*wg3*r13, the word level similarity r14 may be weighted as follows: wg1*wg4*r14, the word level similarity r23 may be weighted as follows: wg2*wg3*r23 and the word level similarity r24 may be weighted as follows: wg2*wg4*r24. In one example, the individual level of similarity may be a weighted sum of results of the word comparisons, wherein the weight assigned to a word comparison may be a combination of contribution weights of the compared word sequences, e.g., following the above example, the individual level of similarity of a1 may be the combination of the four word similarity levels e.g. wg1*wg3*r13+wg1*wg4*r14+wg2*wg3*r23+wg2*wg4*r24.

A level of similarity (or level of matching) between the compared records may be a combination (e.g., sum) of the individual levels of similarities. The level of matching of two records indicates the degree of similarity of the attribute values of the two records. Each similarity of the level of similarity, the individual level of similarities and the word level similarities may be provided as a normalized value (e.g., between 0 and 1) or any other format that enables to match the records. If the level of matching is higher than a predefined similarity threshold, this indicates that the two records are matching. A deduplication system built on this disclosure may then merge the records because they represent the same entity. The merging of records is an operation which can be implemented in different ways. For example, the merging of two records may comprise creating a golden record as a replacement of the similar looking records which have been found to be duplicates to each other. This is known as data fusion or physical collapse with either record or attribute level survivorship. If the level of matching is smaller than or equal to the predefined similarity threshold, this indicates that the two records are not matching and may thus be kept separate data records.

The matching using the present subject matter may be advantageous for the following reasons. For example, the dataset may comprise data of different reference databases having similar content. However, the data may not be consistently separated between these databases because the values of a same attribute such as a company name attribute may be encoded differently. For example, a company named in a record of a first reference database as "Holzbau AG Muttenz" is named differently in a record of a second reference database as "Holzbau GmbH". Due to the encoding of the city name into the company name of the first reference database, standard matching algorithms may struggle to identify these two records as being similar, e.g. the Levenshtein similarity of the two names is 0.6, and the Jaccard similarity is only 0.375. The present subject matter may identify these records as being similar as it estimates and uses further information associated with the entity represented by the two records.

For example, if the modified record is to be compared with a given record of the dataset that has the same value of the missing attribute, the contribution weight assigned to the generated word sequence may be lowered so that it has a lower contribution to the comparison result between the modified record and the given record. According to one embodiment, the comparing of the modified record with a record of the records of the dataset comprises assigning a contribution weight to the generated word sequence, comparing the value of the first attribute of the record with the certain value, and providing the comparison result based on the contribution weight. The contribution weight may be smaller than a threshold. The contribution weight may thus influence the individual level of similarity associated with the first attribute as described above. In case the contribution weight is 0, the comparing of the modified record with a record of the records of the dataset comprises excluding the generated word sequence from the certain value and comparing the value of the first attribute of the record with the resulting certain value.

The matching between a record R1 having attributes, e.g., a1 and a2 and record R2 having attributes a1 and a2, wherein a2 is the synthetic attribute may be performed as follows. Each of the records R1 and R2 may or may not have a value of a2. The present subject matter may use word sequences ws1 and ws2 of the values of a1 in R1 and R2 respectively to estimate the value of a2 for R1 and R2 from the provided metadata as described herein. If the estimated value of a2 of R1 using ws1 is equal to the estimated value of a2 of R2 using ws2, then a contribution weight may be assigned to the word sequences ws1 and ws2 as follows. The contribution weight may, for example, be equal to 0. In another example, the contribution weight may be determined as a function of the levels of presence associated with a2 and the word sequences ws1 and ws2, wherein the function may, for example, be a user defined function. The comparison between records R1 and R2 may be performed as described above to evaluate the level of similarity using the contribution weights.

According to one embodiment, the received record is a structured record or unstructured record or semi unstructured record. An unstructured record may comprise values of one or more attributes which are not organized in a predefined manner, e.g., the values of the attributes may be text of an article. A semi unstructured record may comprise one or more semi unstructured attributes, wherein a semi unstructured attribute has a value which may or may not contain unstructured text such as a company name or a product name.

According to one embodiment, the method further comprises processing an incomplete dataset comprising one or more incomplete records. The incomplete dataset may comprise data of the same domain ontology as the dataset. For example, the dataset used to generate the levels of presence may comprise records of a given reference database while the incomplete dataset may comprise records of another reference database. These two databases represent the same domain ontology as they provide, for example, information on companies. The processing comprises: identifying a record of the incomplete dataset having a certain value of the first attribute and having no values for one or more attributes of the subset of second attributes. The one or more attributes may be called missing attributes. A word sequence may be generated from the certain value. Levels of presence corresponding to the generated word sequence may be identified in the provided metadata. The group associated with the highest identified level of presence may be determined. The distinct value of the subset of second attributes associated with the determined group may be used for determining the values of the missing attributes. This may enable to complete the content of the identified record and thus may provide an efficient method for producing data.

According to one embodiment, the level of presence of the word sequence ("w") in each group ("d") of the formed groups ("D") is a fraction ("tf (w,d)") of word sequences of the group d that are equal to the word sequence w:

$$tf(w, d) = \frac{\text{number of occurences in } w \text{ in } d}{\text{number of word sequences in } d}.$$

In a first fraction example, the number of word sequences in d is the number of all distinct word sequences in the group d. In a second fraction example, the number of word sequences in d is the number of all distinct word sequences in the group d having the same sequence length as the word sequence w.

According to one embodiment, the level of presence of the word sequence w in each group d of the formed groups D is a weighted fraction tf(w,d)*idf(w,D), where $$idf(w, D) = \log\left(\frac{\text{number of groups in } D}{\text{number of groups in containing } w}\right).$$

According to one embodiment, forming the group of words comprises: creating a document and concatenating the values of the first attribute of the identified records in the document using a delimiter. In one example, the delimiter may be a space separator.

The document may be an electronic document. The electronic document may be configured to contain forms of information including text, graphics, etc. An electronic document may, for example, be a PDF document, a Word document, an image document, an e-mail, etc. The electronic document may be formatted in a markup language such as, e.g., a HyperText Markup Language (HTML), an Extensible Markup Language (XML), an eXtensible Hyper Text Markup Language (XHTML), a Standard Generalized Markup Language (SGML), a Wireless Markup Language (WML), or a different semi-structured notation such as the JavaScript Object Notation (JSON), etc.

According to one embodiment, the storage of the levels of presence further comprises: providing a matrix of cells being arranged in columns and rows. Each column in the matrix represents a respective group of the formed groups and each row in the matrix represents a distinct word sequence of the distinct word sequences. The levels of presence may be stored in respective cells of the matrix.

According to one embodiment, the storage of the levels of presence comprises selecting levels of presence higher than a predefined threshold and storing the selected levels of presence. This may save storage resources while still making use of the metadata to process the dataset.

According to one embodiment, the method further comprises repeating the method until all first attributes of the set of attributes are selected. The method may automatically be performed. This may enable an automatic generation of the metadata, e.g., as soon as new datasets are stored.

FIG. 1 depicts an exemplary computer system 100. The computer system 100 may, for example, be configured to perform master data management and/or data warehousing, e.g., the computer system 100 may enable a de-duplication system. The computer system 100 comprises a data integration system 101 and one or more client systems or data sources 105. The client system 105 may comprise a computer system (e.g., as described with reference to FIG. 6). The client systems 105 may communicate with the data integration system 101 via a network connection which comprises, for example, a wireless local area network (WLAN) connection, WAN (Wide Area Network) connection, LAN (Local Area Network) connection the internet or a combination thereof. The data integration system 101 may control access (read and write accesses, etc.) to a central repository 103.

Data records stored in the central repository 103 may have values of a set of attributes 109A-P such as a company name attribute. Although the present example is described in terms of a few attributes, more or less attributes may be used. The dataset 107 that is used in accordance with the present subject matter may comprise at least part of the records of the central repository 103.

Data records stored in the central repository 103 may be received from the client systems 105 and processed by the data integration system 101 before being stored in the central repository 103. The received records may or may not have the same set of attributes 109A-P. For example, a data record received from client system 105 by the data integration system 101 may not have all values of the set of attributes 109A-P, e.g., the data record may have values of a subset of attributes of the set of attributes 109A-P and may not have values for the remaining attributes. In other terms, the records provided by the client systems 105 may have different completeness. The completeness is the ratio of number of attributes of a data record comprising data values to a total number of attributes in the set of attributes 109A-P. In addition, the received records from the client systems 105 may have a structure different from the structure of the stored records of the central repository 103. For example, a client system 105 may be configured to provide records in XML format, JSON format or other formats that enable to associate attributes and corresponding attribute values.

In another example, data integration system 101 may import data records of the central repository 103 from a client system 105 using one or more Extract-Transform-Load (ETL) batch processes or via HyperText Transport Protocol ("HTTP") communication or via other types of data exchange.

The data integration system 101 may be configured to process the received records using one or more algorithms such as an algorithm 120 implementing at least part of the present method. For example, the data integration system 101 may process a data record received from the client systems 105 using the algorithm 120 in order to find matching records in the dataset 107 in accordance with the present subject matter.

Figure 2:
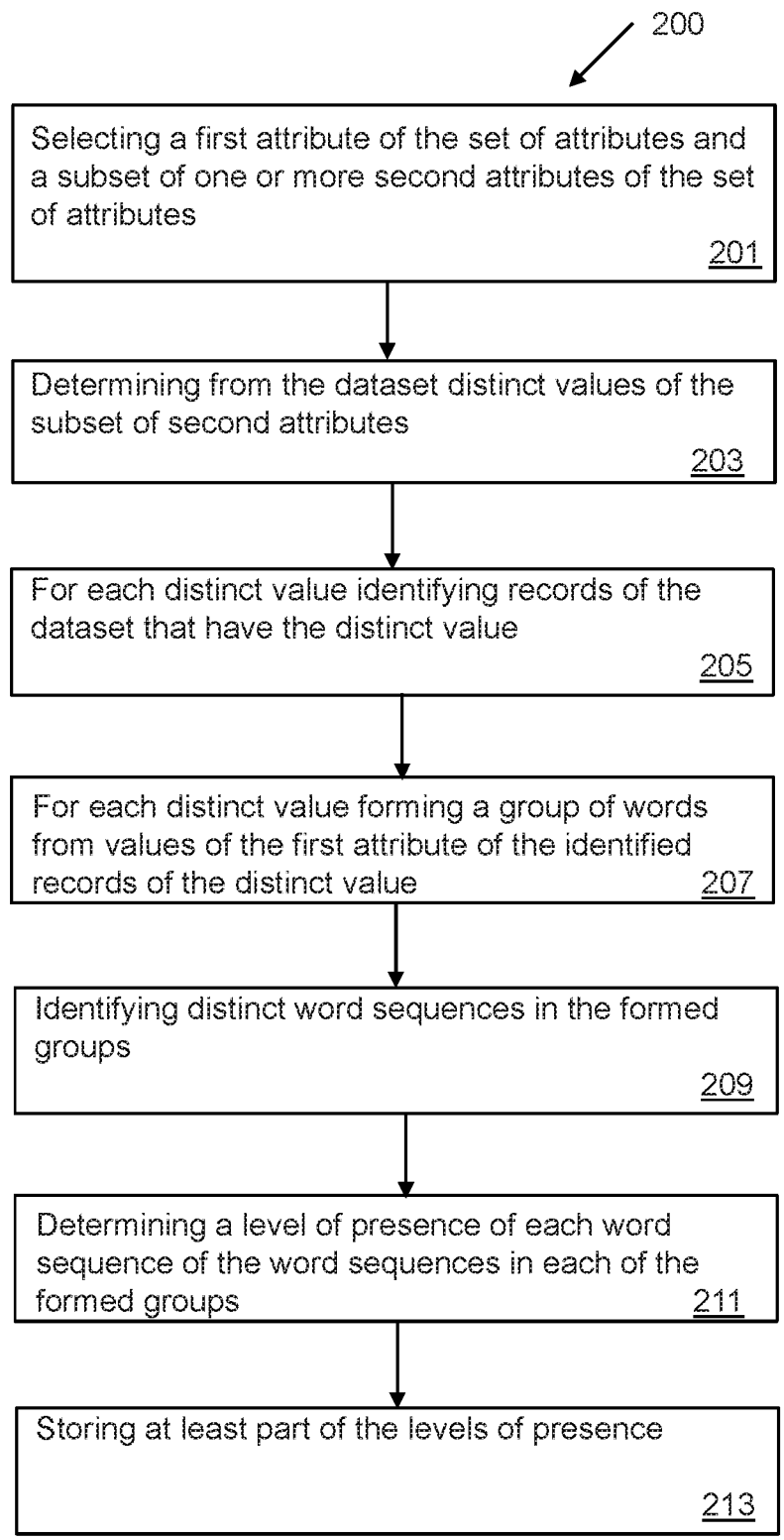
FIG. 2 is a flowchart of a method for enabling a processing of a dataset in accordance with an embodiment of the present disclosure.

FIG. 2 is a flowchart of a method 200 for enabling a processing of a dataset 107 of records having a set of attributes. For the purpose of explanation, the method 200 described in FIG. 2 may be implemented in the computer system 100 illustrated in FIG. 1, but is not limited to this implementation.

A first attribute of the set of attributes 109A-P may be selected in step 201. The first attribute may be named ATT1. Additionally, a subset of one or more second attributes of the set of attributes 109A-P may be selected in step 201. The subset of second attributes may be named SUBATT2. The first attribute ATT1 is different from each attribute of the subset of second attributes SUBATT2. The first attribute ATT1 may, for example, be of a string type. The value of the first attribute ATT1 may comprise one or more words separated by spaces. For example, the value "Bcde Airways" has two words: "Bcde" and "Airways". The subset of second attributes SUBATT2 may, for example, be dependent attributes. That is, the values of a second attribute of the subset SUBATT2 may be correlated or dependent on the behavior of the values of other second attributes of the subset SUBATT2.

In a first selection example, step 201 may comprise prompting a user to select the first attribute ATT1 and the subset of second attributes SUBATT2 of the set of attributes and receiving a user input indicative of the selected first attribute ATT1 and the subset of second attributes SUBATT2. This may be advantageous as it may provide a reliable and controllable processing of the dataset 107, e.g., it may prevent unnecessary processing due to irrelevant selected attributes.

In a second selection example, the first attribute ATT1 and the subset of second attributes SUBATT2 may automatically be selected. The automatic selection of the first attribute ATT1 and the subset of second attributes SUBATT2 may, for example, randomly be performed. Another option is to iterate over all possible permutations for ATT1 and SUBATT2. A random selection may speed up the processing. This may also particularly be advantageous in case of an iterative processing of all attributes of the set of attributes 109A-P. Independently, of the selection criterion, the selection of the first attribute ATT1 may first be performed based on a predefined selection criterion that may, for example, require the first attribute ATT1 to be a key of the dataset 107 or require the first attribute ATT1 to have the highest number of distinct values compared to the other attributes or require the first attribute ATT1 to have a specific type, e.g., string type. This may be advantageous as it may increase the accuracy of the present method. Likewise, the automatic selection of the subset of second attributes SUBATT2 may be performed based on a selection criterion that may, for example, require SUBATT2 to have at most a given number of distinct values.

In a third selection example, the first attribute ATT1 may be selected by the user while the second subset of second attributes SUBATT2 may automatically be selected or vice versa.

The distinct values of the subset of second attributes SUBATT2 present in the dataset 107 may be determined in step 203. The number of determined distinct values in step 203 may be N distinct values DV1, DV2 . . . DVN, where N≥1. Assuming, for simplification of the description, that the subset of second attributes SUBATT2 comprises two attributes a1 and a2 representing a company nickname and a corresponding city respectively, and the dataset 107 comprises five records R1 to R5. In this example, the attributes a1 and a2 may be correlated, e.g., the correlation between a1 and a2 may be higher than a predefined minimum correlation level. If the correlation between the two attributes a1 and a2 is smaller than the minimum correlation level, the method may be applied independently first to attribute a1 and subsequently again to attribute a2 by for example using SUBATT2 having a1 in a first iteration and SUBATT2 having a2 in another iteration. The records R1 to R5 may have the following respective values of the first attribute ATT1: "Abcde Airlines", "Deela Airlines", "Ammi Airlines", "Rroomn GmbH" and "Boccch GmbH". The records R1 to R5 may have the following values of a1: "MR, MTT, MAH, MR, MS" and corresponding values of a2: "Wiesbaden, Paris, Hamburg, Wiesbaden, Hamburg". The five possible values of (a1, a2) are thus the following values: (MR, Wiesbaden), (MTT, Paris), (MAH, Hamburg), (MR, Wiesbaden) and (MS, Hamburg). However, only four values (N=4) are distinct values of (a1, a2), i.e., DV1=(MR, Wiesbaden), DV2=(MTT,Paris), DV3=(MAH, Hamburg) and DV4=(MS,Hamburg). Step 203 may result in the distinct values DV1, DV2, DV3 and DV4.

For each distinct value of the determined N distinct values, records (named IDR) of the dataset 107 that have said each distinct value may be identified in step 205. Step 205 may result in identified records IDR1, IDR2 . . . and IDRN of the respective N distinct values DV1, DV2 . . . and DVN, e.g., DV1 is associated with (or corresponds to) IDR1, DV2 is associated with IDR2 . . . and DVN is associated with IDRN. Following the above example, step 205 may identify the records R1 and R4 as having the same distinct value (MR,Wiesbaden), and R2 as having the distinct value (MTT,Paris) etc. Thus, the identified records IDR1 associated with the distinct value DV1 may comprise records R1 and R4 and the identified records IDR2 associated with the distinct value DV2 may comprise record R2 etc.

For each distinct value DVi of the determined N distinct values, a group di of words may be formed in step 207 from values of the first attribute of the identified records IDRi associated with the distinct value DVi. This may result in N groups associated with the respective distinct values DV1 to DVN. The values of the first attribute of the identified records may be concatenated in the group of words using a delimiter. In one example, each group of the formed groups may be stored in a respective document or in a respective array, wherein the document or the array is associated with a descriptor indicating the distinct value of the group. Following the above example, a group di may be created from the identified records IDR1 of the distinct value DV1, by selecting words from the values of the first attribute of the records R1 and R4 and adding them together in the group d1. The group d1 may be associated with a descriptor that indicates the distinct value DV1. And a group d2 may be created from the identified records IDR2 of the distinct value DV2, by selecting words from the values of the first attribute of the records R2 and adding them together in the group d2, etc. The group d2 may be associated with a descriptor that indicates the distinct value DV2.

In a first group determination example, the values of the first attribute in the identified records IDRi of a distinct value DVi may be concatenated using a space separator (or other separators such as commas) between the concatenated values and inserted in a document di. The end of the last word of an attribute value may be joined with the beginning of a first word of a next attribute value. Following the above example, the document d1 may contain a concatenation of the values of the first attribute of the records R1 and R4 as follows "Abcde Airlines Rroomn GmbH", if the space separator is used or "Abcde Airlines, Rroomn GmbH" if a comma separator is used.

After forming the groups, the method proceeds to step 209 where distinct word sequences are identified in the formed groups di. A word sequence comprises one or more words. The word sequence may, for example, be a n-gram of words, where n≥1. Using n-grams may be advantageous for the following reasons. Word sequences like "Credit Mars" (n=2), "Credit Mars" (with underscore between words) or "Credit Mars" with quotes around words may be considered as a single distinct word sequence. Step 209 may result in W identified distinct word sequences. For example, a word sequence may be one word such as "Rroomn" or two words such as "Rroomn GmbH". In a preferred embodiment, a combination of different numbers of words may be chosen. This may be advantageous. For instance, by using a single word, it may be determined that the word "machines" is typically used in conjunction with manufacturing. However, if the same structure is computed for a sequence of two words, the two-word combination "business machines" may actually refer to computer systems.

In a first word sequence identification example, step 209 may comprise: determining or defining one or more sequence lengths, identifying all possible word sequences in the group di that has the one or more sequence lengths and selecting from the identified word sequences distinct word sequences. Following the above example of group d1, and assuming that the sequence lengths are one and two, all possible word sequences may be the following: "Abcde Airlines", "Airlines Rroomn" and "Rroomn GmbH", "Abcde", "Airlines", "Rroomn", "GmbH" which are all distinct (W=7). This example may particularly be advantageous in case the concatenation is performed by space separators. If, for example, the number of identified word sequences is smaller than a predefined threshold, additional one or more sequence lengths may be used, and new word sequences may be identified using the additional sequence lengths.

In a second word sequence identification example, step 209 may comprise: defining one or more sequence lengths, identifying all possible word sequences in each attribute value in the group di that has the one or more sequence lengths and selecting from the identified word sequences distinct word sequences. This example may particularly be advantageous in case the concatenation is performed by comma separators (or another separator not present in any of the values of ATT1). That is, the word sequences are searched in the words quoted between commas. Following the above example of group d1, and assuming that the sequence length is two, all possible word sequences may be the following: "Abcde Airlines", and "Rroomn GmbH" which are all distinct (W=2). Somebody skilled in the art, will identify that other representations are also possible such as immediately enumerating the word sequences and associating each word sequence with a number indicating how often that sequence occurs.

The definition of more than one sequence length, in step 209, may be performed as follows. The more than one sequence length H may be all possible sequence lengths. Following the above example of group d1, the sequence lengths may be the following: Abcde, Airlines, Rroomn, GmbH, Abcde Airlines, Rroomn GmbH. I.e., this results in 6 possible word sequences. In this simplistic example, none occurs twice, so each word sequence has a term frequency tf(w, d1) of ⅙ according to the first fraction example. The second fraction example may be used if more weights should be given to two word sequences. In this case, instead of dividing by the total number of distinct word sequences, the division may be performed by the size of the set containing H words. In this case, the term frequency tf(w, d1) may be ¼ for the single words and ½ for the two words.

In another example, the definition of more than one sequence length, in step 209, may be performed using received input. The input may, for example, be received from a user. The input may, for example, indicate which word sequences may be used. Following the above example, the input may indicate the word sequences "Abcde", "Airlines", "Rroomn", "GmbH", "Abcde Airlines" (i.e. "Rroomn GmbH" is not indicated in the input).

After identifying the W distinct word sequences, the method proceeds to step 211, where a level of presence of each word sequence of the identified distinct word sequences in each of the formed groups is determined. For example, each group di of the groups is processed to determine W levels of presence of the W distinct word sequences in the group di. That is, step 211 may result in W×N levels of presence. If for example, a word sequence is not present in a given group, the level of presence of that word sequence in that group may be set to a predefined value, e.g., zero.

In a first level of presence example, the level of presence of a word sequence w in a group di may be defined as the fraction tf(w, di) of words of the group di that are equal to the word sequence w, $$tf(w, di) = \frac{\text{number of occurences in } w \text{ in } di}{\text{number of distinct word sequences in } di}.$$

Following the above example of group d1, tf ("Abcde Airlines", d1)=0.5 and tf("Rooomn GmbH", d1)=0.5.

In a second level of presence example, the level of presence of a word sequence w in a group di may be defined as a weighted fraction tf(w, di)*idf(w,D), where $$idf(w, D) = \log\left(\frac{\text{number of groups in } D}{\text{number of groups in containing } w}\right).$$

The W×N levels of presence may be represented as a matrix LP (i,j) having N columns representing the N groups and W rows representing the W distinct word sequences. That is, the values in a row may indicate the importance of a given word sequence w in each group of the N groups.

At least part of the W×N levels of presence may be stored, in step 213, in association with the dataset 107. The at least part of the W×N levels of presence may be provided as a metadata of the dataset 107. In one example, all the W×N levels of presence may be stored. In another example, a selected subset of the W×N levels of presence may be stored. This may, for example, enable a processing of the dataset using the levels of presence. This may also enable to process other datasets that have the same domain ontology of the dataset. Datasets of a same domain ontology may comprise records each having at least part of the set of attributes 109A-P. A domain ontology represents concepts or categories which belong to a part of the world, such as biology or politics. For example, a domain ontology can refer to a healthcare, advertising, commerce, medical or biomedical-specific field. The domain ontology of the dataset 107 may, for example, be determined using the values of the first attribute ATT1.

In one example, steps 209 and 211 may be executed K times (K≥1) using a different sequence length for each iteration. This may result in K matrices LP1 . . . LPK associated with the first attribute ATT1. This may be advantageous as it may provide a rich and sufficient additional matata that enables to process the dataset 107 as exemplified previously by the "machines" and "business machines" example. The execution of steps 209 and 211 K times (K>1) may particularly be advantageous if a single sequence length is used in each step 209. However, if a variable length word sequence is used (e.g. K=1) in step 209 (e.g. more than one sequence length is used), the iteration of steps 209 and 211 may not be performed as the resulting single matrix LP may be sufficient.

The method steps 201-211 may be repeated for a different first attribute and subset of second attributes. The repetition may, for example, be automatically performed until all the attributes 109A-P are selected as first attribute ATT1. If the set of attributes 109A-P comprises J attributes, the method may result in at most K matrices LP per attribute of the/attributes. The J×K matrices may be stored at least in part in association with the dataset 107. For example, all J×K matrices LP may be stored in association with the dataset 107. Each stored matrix LPi (i=1 . . . J×K) may be associated or tagged with a descriptor, wherein the descriptor comprises the sequence length(s) used to produce the matrix and the first attribute ATT1. The stored matrices LPi may be named identification matrices.

Figure 3:
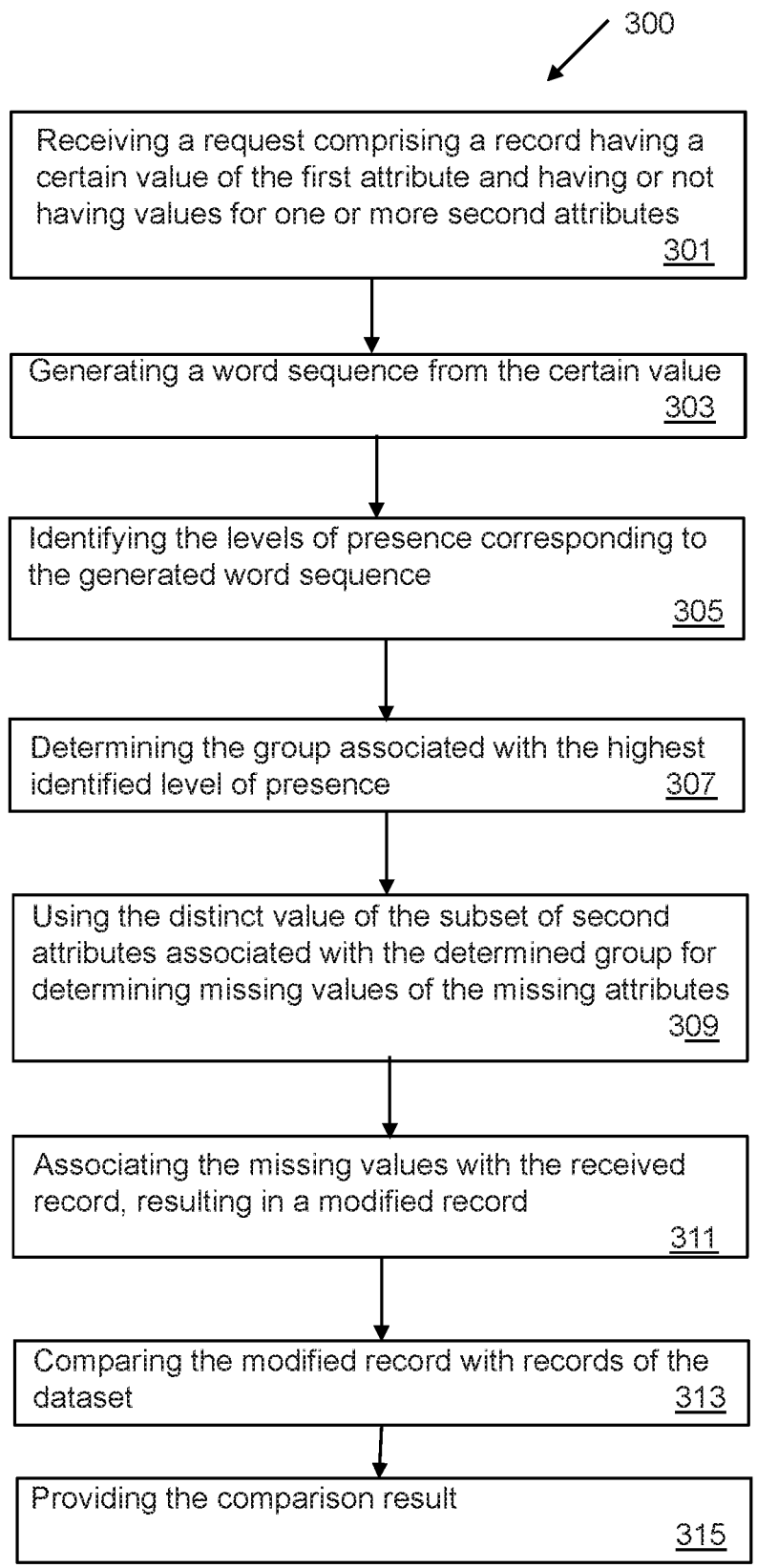
FIG. 3 is a flowchart of a record matching method in accordance with an embodiment of the present disclosure.

FIG. 3 is a flowchart of a record matching method 300 in accordance with an example of the present subject matter. For the purpose of explanation, the method 300 described in FIG. 3 may be implemented in the computing system 100 and/or method 200 (illustrated in FIG. 1 and FIG. 2, respectively) but is not limited to this implementation.

A request may be received in step 301. The request comprises a record. The received record may be a structured or an unstructured record. In case of a received unstructured record, e.g., an article, step 301 may further comprise a processing of the unstructured record to identify attribute values encoded in the received record. The received record has a certain value of the first attribute ATT1 and has no values for one or more attributes of the subset of second attributes SUBATT2. The one or more attributes may be called missing attributes. Following the example of FIG. 2, the missing attribute may be attribute a2. The request may, for example, be a request to store the record. In another example, the request may be a matching request for matching the record with records of the dataset 107. In both cases, a matching of the record with records of the dataset 107 may be required, e.g., before storing a received record it may be matched with existing ones to prevent storing duplicate records.

At least one word sequence may be generated in step 303 from the certain value of the first attribute ATT1. The word sequence may be generated as described with reference to FIG. 2 using one or more sequence lengths that have been used to produce the stored identification matrices. The one or more sequence lengths may be all sequence lengths used in step 209. For example, the descriptors of the identification matrices may be parsed to find out which sequence length(s) is associated with the first attribute ATT1 of the received record.

The generated word sequence may be represented by a row of the identification matrix associated with the first attribute ATT1 of the received record and associated with the sequence length used in step 303. This may enable to identify in step 305, the levels of presence corresponding to the generated word sequence. This may result in N levels of presence of the row representing the generated word sequence. Each of the N levels indicates the importance of the generated word sequence in the respective group. Each of the N levels belongs to a column that represents one of the N formed groups di. This may enable to determine in step 307, the group associated with the highest level of presence of the N levels of presence.

The distinct value DVi of the subset of second attributes SUBATT2 associated with the determined group of step 307 may be used in step 309 for determining missing values of the missing attributes. Following the above example, the received record may have the certain value of the first attribute ATT1 and another value of the second attribute a1; however, the value of the attribute a2 is missing. In this case, the distinct value DVi associated with the determined group of step 307 may have two values of a1 and a2. The value of a2 in DVi may be used as the value of the missing attribute of the received record.

The determined missing value(s) may be added in the received record, resulting in a modified record in step 311. The modified record may be compared with records of the dataset in step 313. Using additional information in the received record may enable an accurate matching. The result of the comparison may be provided in step 315. Based on the comparison result, the received record may be stored in the dataset, e.g., if there is no match.

Figure 4:
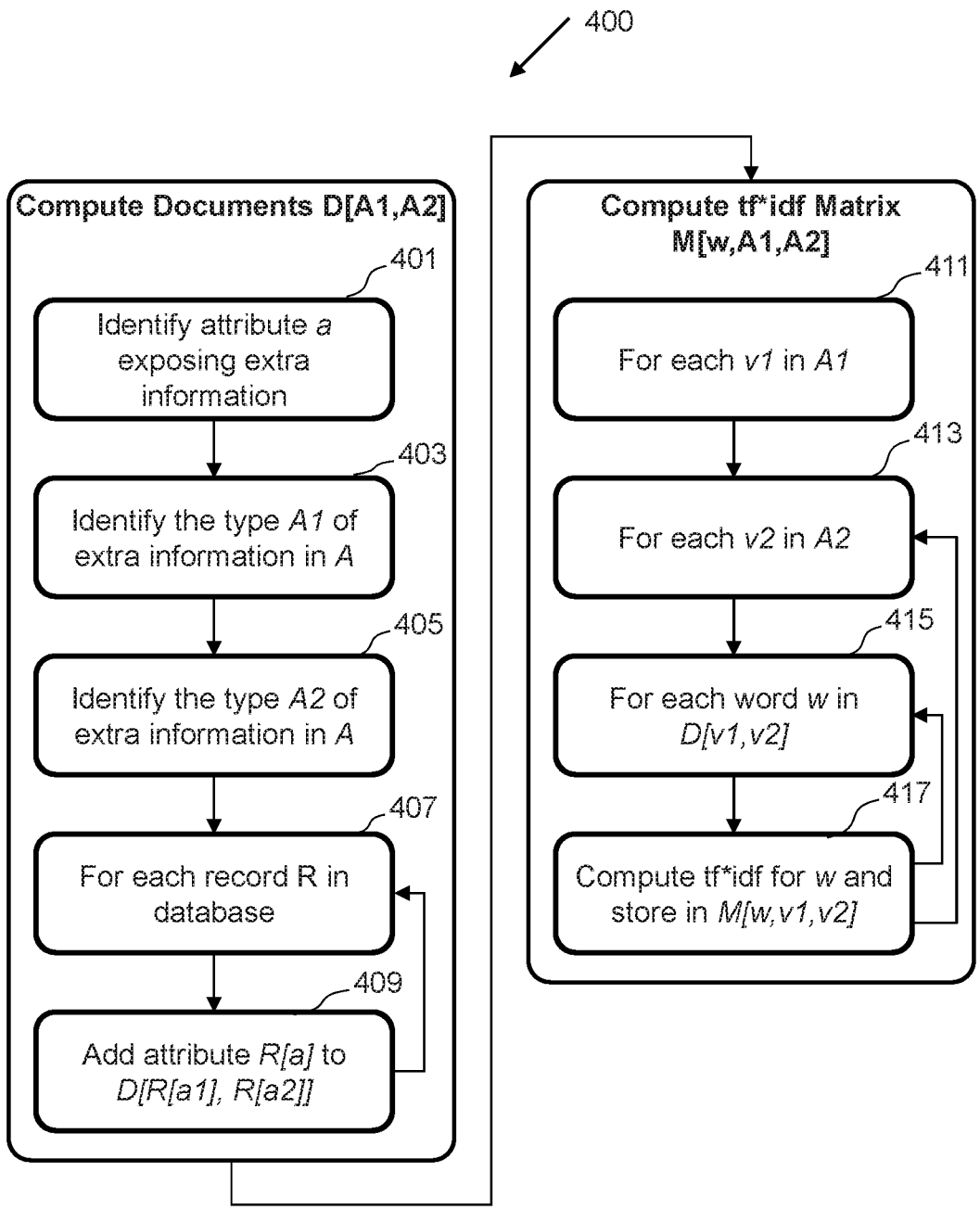
FIG. 4 is a flowchart of a method to compute a feature identification matrix in accordance with an embodiment of the present disclosure.

FIG. 4 is flowchart of a method 400 to compute a feature identification matrix in accordance with an example of the present subject matter. The feature identification matrix may be computed using a dataset, e.g., 107 stored in a reference database.

The term record ("R") may be used, in this example, to represent a structured company entity ("E"). Each record may contain multiple attributes ("ai") such as the entity's unique identifier, name, industry type, or address. The present method may enable to learn specific words (or word sequences) from a given attribute ai that indicates information about another attribute type aj (i≠j). To accomplish this, a multidimensional array of documents D [a1, a2, ..., an] may be provided, where n indicates the number of dependent dimensions to capture (e.g., n is the number of attributes in SUBATT2 described above). For instance, in order to capture the words indicating the company's industry, an array of documents D [a1] may be built where a1 represents the possible industries, e.g., one document per industry. However, if the words indicative for various industries may differ by country, it may be advantageous to build an array of documents D[a1; a2] where a1 represents the industry and a2 indicates the country, e.g., one document per industry per country. This may allow a company to be associated with one or more industries and with one or more countries.

As shown in FIG. 4, the attribute a may first be identified in step 401. The identified attribute a may expose additional information (e.g., the company name) that can be used to generate additional synthetic attributes. Next, attributes a1 (e.g., the industry) and a2 (e.g., the country) may be identified in steps 403 and 405 respectively. As indicated with steps 407 and 409 in FIG. 4, an iteration may be performed over all the records R in the dataset 107. While iterating, the attribute a of each record R (i.e., R[a]) may be added to the document corresponding to R [a1] and R[a2] (e.g., D[R [a1]; R [a2]]=D[R [a1]; R [a2]]+" "+R[a]). Note that initially all the documents are empty (i.e., $\forall v1 \in A1: \forall v2 \in A2: D[v1; v2]=$" " where Ai represents the set of possible values of attribute ai.

Once the documents have been generated, a term frequency-inverse document frequency (tf-idf) may be built for the words w used by attribute a. The frequency tf-idf is used because the same words (or word sequences) can occur in multiple documents contained in D. The values of frequency tf-idf is stored in a second multidimensional matrix M[w, a1, a2, ..., an]. This is accomplished by iterating (steps 411 and 413) over all the possible values of attribute a1 (i.e., $\forall v1 \in A1$) and all the possible values of attribute a2 (i.e., $\forall v2 \in A2$). Next, an iteration (step 415) over all the words contained in the document D [v1; v2] may be performed, and the frequency tf-idf may be computed (417) for the word w. The computed frequency tf-idf may be stored in the matrix M[w; v1; v2]. Considering that not all combinations of v1 and v2 may exist, the Matrix M[w; v1; v2] may be stored as a sparse matrix or in the form indicated previously as a matrix between w and the pair (v1, v2), e.g., M[w; (v1, v2)].

The term frequency-inverse document frequency may be advantageous for the following reasons. The term frequency is a function that indicates how often the term occurs within a given document. The inverse document frequency is a function that indicates how important the term is with respect to the other documents in the corpus. In other words, the inverse document frequency serves to offset the importance of a given word w in a document d by the number of documents in the corpus D that contain the word. The present subject matter makes use of the two because the term-frequency inverse document frequency is the product of the two frequencies. In one example, the frequency tf-idf may be defined as follows:

$$tf(w, d) = \frac{\text{number of occurences in } w \text{ in } d}{\text{number of words in } d},$$

$$idf(w, D) = \log\left(\frac{\text{number of groups in } D}{\text{number of documents in containing } w}\right)$$

and tf-idf=tf(w,d)*idf(w,D).

Another example may use different functions to define the term-frequency (tf), inverse document frequency (idf), or both. The different functions may for instance take the length of the individual documents into account, which may be of interest if the distribution of the companies over the industries and countries is uneven. Yet another example may identify stop-words from the documents and remove them before calculating the frequency tf-idf to reduce the size of the documents. Corpus-specific stop-words may also be removed by identifying the words that are contained in more than x % of all the documents.

FIG. 4 shows the workflow for a 2-dimensional set of documents. However, a person of skill in the art, will be able to reduce it to a single dimension, or extend it to multiple dimensions. Since the matrix M may be large it may be compressed by storing only entries that peak above other entries such as storing only the top 100 or top 5% of words indicative for a given industry/country combination. Alternatively, a strategy that uses an "Elbow Method" to determine the threshold for relevant words may be applied. Words not contained in the final tf-idf matrix may be assumed to have a default tf-idf value which may be zero, the lowest tf-idf score available, or the average of the score of the removed words. In a preferred example, this score as well as the number of words to retain is user-configurable.

Figure 5:
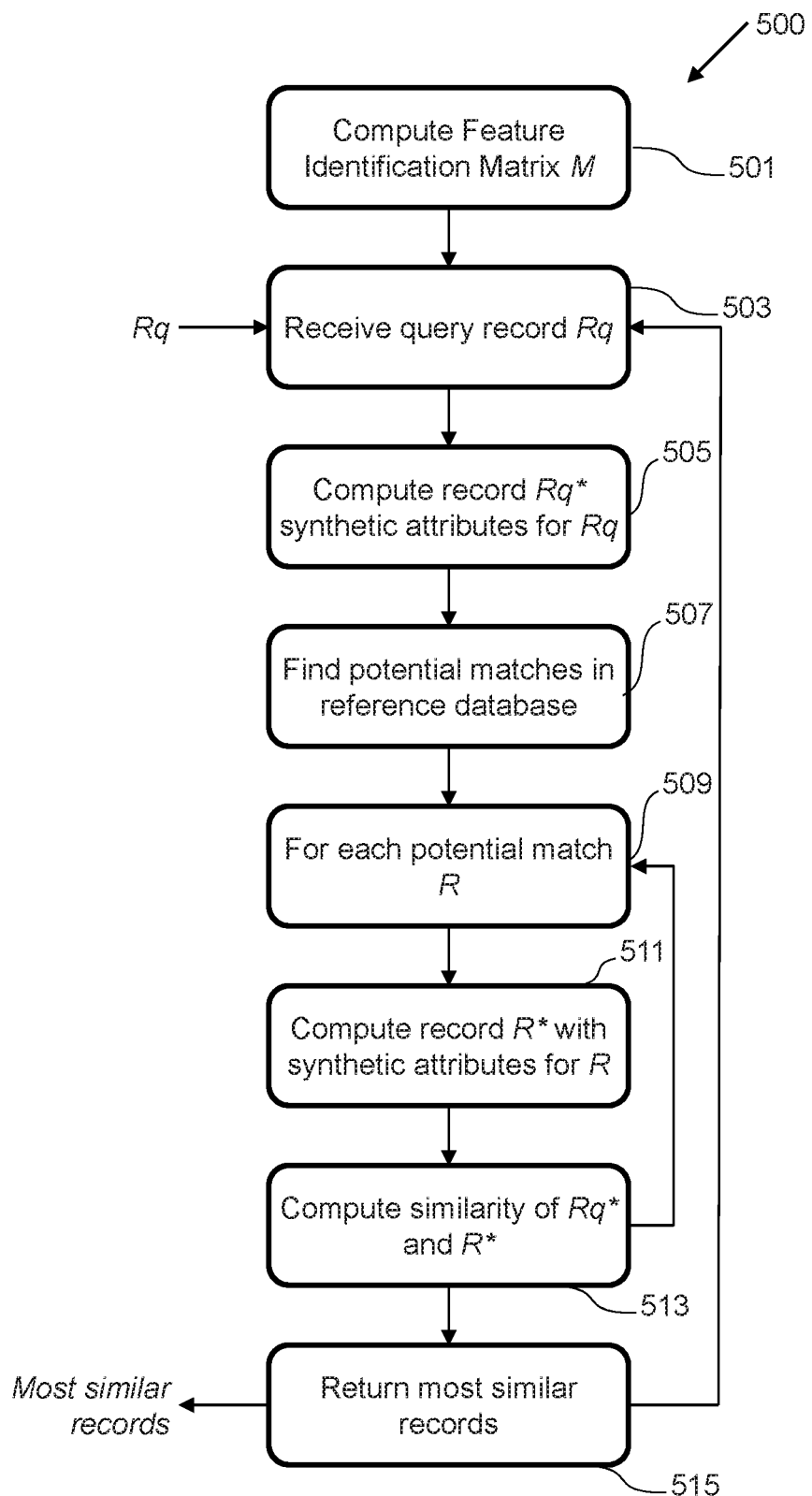
FIG. 5 is a flowchart of a record matching method in accordance with an embodiment of the present disclosure.

FIG. 5 is a flowchart of a record matching method 500 in accordance with an example of the present subject matter.

Once the tf-idf matrix M has been computed (step 501), it may be used as is for further consumption. Given the matrix M that indicates how representative a given word w is for a given industry i in the country c, it may be computed how likely a company is associated with a certain industry. Assuming a company name entity Rq={name=n; country=c} is received (step 503), the industry vector $v_{ind}$ that indicates how likely the company is associated with each industry may be obtained from the matrix M through M[w;*; c] as follows: $v_{ind}=E_{w \in n}$ M[W;*; c]. Thus, $v_{ind}$[i] indicates how likely the received record Rq is associated with industry i. The top n industries associated with the record Rq may be stored in the synthetic attribute R [industry*]. Similarly, if no country is given for the record Rq, the most likely country may be derived from a matrix M[w; a2] that has been generated through a single country attribute a2. The country would be computed as follows: $v_{country}=\Sigma_{w \in n}$ M[w;*]. Based on $v_{country}$[c], the probability with which the record Rq is associated with a given country c may be determined and used for further processing and, for instance, store it in the synthetic attribute R [country*]. The synthetic attributes R[country*] and R [industry*] may be used to complete (step 505) the received record Rq, resulting in a completed record Rq*.

In addition to synthesizing additional attributes (e.g., R[country*] and R[industry*]), the matrix M allows to identify the words that contributed to this identification. All this synthetic information can be used when subsequently comparing two entities (from structured or unstructured sources) as provided in the following examples.

The completed record Rq* may be used to find (step 507) potential matches in the reference database. An iteration (step 509) over the matched records R may be performed in order to compute (step 511) for each record R a completed record R* and the obtained completed record R* of the reference database may be compared (step 513) with the received completed record Rq*. The most similar records may be provided in step 515. Steps 503 to 515 may be repeated for each received record.

Following are examples for performing record matching using synthetic attributes in accordance with the present subject matter.

Comparison of a structured record $R_1$ and another structured record $R_2$.

The record $R_1$ may be defined as follows: $R_1$={name="Bäckerei-Konditorei Hug AG", sic="2051"}. $R_1$ has attributes name and industry code sic. The record $R_2$ may be defined as follows: $R_2$={name="Hug Backerei AG", sic="2051"}. Although each of the two records has (original) values of all attributes, an estimation of a value of one of the two attributes according to the present subject method may additionally be performed. This may result in each of the two structured records $R_1$ and $R_2$, having the original attribute values, as well as the synthetic attribute values. If the synthetic attribute values of either record match the corresponding synthetic or non-synthetic attribute values of the other record, the synthetic attribute value may be considered as a match. This also means, that the words that helped to identify the synthetic attribute, in accordance with the present subject matter, have been matched on a semantic level. Hence, their weight within the attribute used to derive the synthetic attribute can be reduced. This reduction may either be a constant factor or a factor derived from the identification matrix.

Without using the present subject matter, the similarity of the two records may be equal to 14/32≈0.44 for the names and 1.0 for the industry. Using the present subject matter may enable to determine/estimate another value of the SIC code of the two records. For that, one or more word sequences may be generated from each of the two attribute values "Bäckerei-Konditorei Hug AG" and "Hug Bäckerei AG". For example, the word sequence "Konditorei" may be generated from the attribute value "Backerei-Konditorei Hug AG" and the word sequence "Bäckerei" may be generated from the attribute value "Hug Bäckerei AG". The rows of the identification matrix that represent the two generated word sequences may be identified, and the corresponding values of the SIC code may be extracted. In this example, the estimated values of the SIC codes may be the same as their original values in $R_1$ and $R_2$. Thus, the two generated word sequences match the same SIC code in the identification matrix. In other words, the word sequence "Bäckerei" of record $R_2$ matches the SIC code of the record $R_1$, and the word sequence "Konditorei" of record $R_1$ matches the SIC code of the record $R_2$. Thus, the two word sequences may have no significance when comparing $R_1$ and $R_2$. In this case, the matching between the records $R_1$ and $R_2$ may be adapted by excluding the generated word sequences from the comparison process (e.g. they may be assigned a weight 0). The resulting similarity would be 1.0 for the name attribute (because the two compared values are "Hug AG" and "Hug AG" of $R_1$ and $R_2$.) and 1.0 for the industry code. Thus, with the present subject matter may improve the matching process.

Comparison of a structured record $R_1$ and an unstructured record $R_2$.

This case may be a subset of the comparison between structured records described above. The difference is that one of the two records $R_1$ or $R_2$ only has synthetic attributes and hence a comparison against a non-existent non-synthetic attribute may not be performed. Therefore, a comparison is performed only against its synthetic attribute. The record $R_1$ may be defined as follows: $R_1$={name="Bäckerei-Konditorei Hug AG", sic="2051"} and record $R_2$ may be defined as follows: $R_2$={name="Hug Backerei AG"}. The only difference with the first example is that the record $R_2$ has no original value of the SIC code. As described above, using the present subject matter it may be determined that the estimated SIC code for both records $R_1$ and $R_2$ is the same 2051. The weights of the two word sequences would be 0 as described above.

Figure 6:
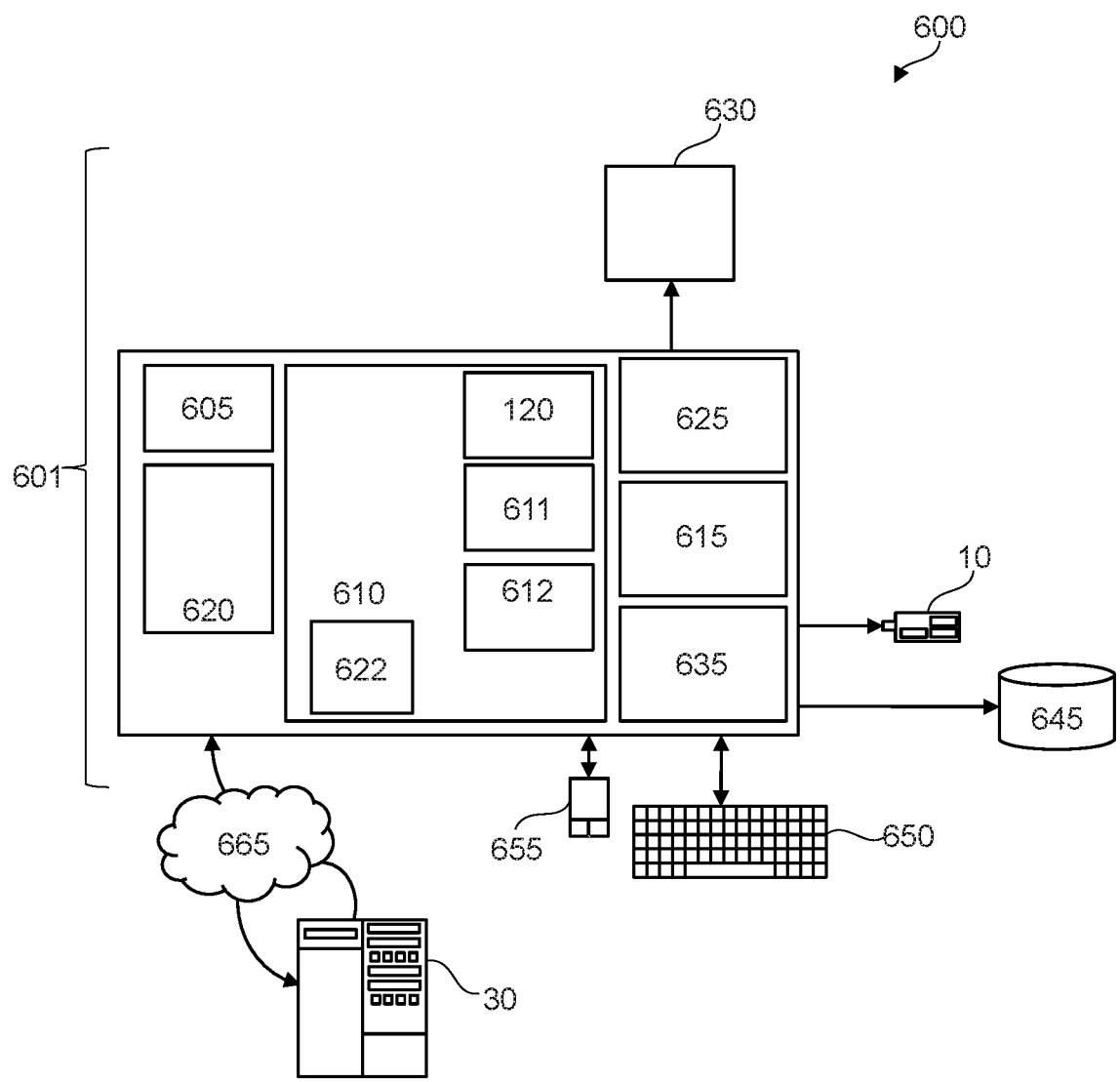
FIG. 6 represents a computerized system, suited for implementing one or more method steps in accordance with an embodiment of the present disclosure.

FIG. 6 represents a general computerized system 600 (e.g. the data integration system) suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this disclosure. In the example of FIG. 6, software in the memory 610 includes instructions 612 e.g. instructions to manage databases such as a database management system.

The software in memory 610 shall also typically include a suitable operating system (OS) 411. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage.

The present subject matter comprises the following clauses.

Clause 1: A computer implemented method for processing of a dataset of records having a set of attributes, comprising: selecting a first attribute of the set of attributes and a subset of one or more second attributes of the set of attributes; determining from the dataset distinct values of the subset of second attributes; for each distinct value of the determined distinct values: identifying records of the dataset that have said each distinct value, and forming a group of words from values of the first attribute of the identified records; identifying distinct word sequences in the formed groups, each word sequence comprising one or more words, and determining a level of presence of each word sequence of the word sequences in each of the formed groups; storing at least part of the levels of presence.

Clause 2: The method of clause 1, further comprising: receiving a matching request, the matching request comprising a record having a certain value of the first attribute and having or not having values for one or more attributes, called hereinafter missing attributes, of the subset of second attributes; generating a word sequence from the certain value; identifying the levels of presence corresponding to the generated word sequence; determining the group associated with the highest identified level of presence; using the distinct value of the subset of second attributes associated with the determined group for determining missing values of the missing attributes; associating the missing values with the received record, resulting in a modified record; comparing the modified record with records of the dataset; providing the result of the comparison.

Clause 3: The method of clause 2, wherein the comparing of the modified record with a record of the records of the dataset comprises assigning a contribution weight to the generated word sequence and comparing the value of the first attribute of the record with the certain value, providing the comparison result based on the contribution weight.

Clause 4: The method of clause 2 or 3, the received record being a structured or unstructured record.

Clause 5: The method of any of the preceding clauses 1 to 4, further comprising processing an incomplete dataset comprising one or more incomplete records, the processing comprising: identifying a record of the database having a certain value of the first attribute and having no values for one or more attributes, called missing attributes, of the subset of second attributes; generating a word sequence from the certain value; identifying levels of presence corresponding to the generated word sequence; determining the group associated with the highest identified level of presence; using the distinct value of the subset of second attributes associated with the determined group for determining the values of the missing attributes.

Clause 6: The method of any of the preceding clauses 1 to 5, wherein the level of presence of the word sequence, w, in each group, d, of the formed groups, D, is a weighted fraction tf(w,d)*idf(w,D) of words of the group d, wherein $$tf(w, d) = \frac{\text{number of occurences in } w \text{ in } d}{\text{number of word sequences in } d},$$

$$\text{and } idf(w, D) = \log\left(\frac{\text{number of groups in } D}{\text{number of groups containing } w}\right).$$

Clause 7: The method of any of the preceding clauses 1 to 6, wherein forming the group of words comprises: creating a document and concatenating the values of the first attribute of the identified records in the document using a delimiter.

Clause 8: The method of any of the preceding clauses 1 to 7, the storing further comprising: providing a matrix of cells being arranged in columns and rows, each column in the matrix representing a respective group of the formed groups and each row in the matrix representing a distinct word sequence of the distinct word sequences, storing the levels of presence in respective cells of the matrix.

Clause 9: The method of any of the preceding clauses 1 to 8, the storage of the levels of presence comprising selecting levels of presence higher than a predefined threshold and storing the selected levels of presence.

Clause 10: The method of any of the preceding clauses 1 to 9, further comprising repeating the method until all first attributes of the set of attributes are selected.

Clause 11: The method of any of the preceding clauses 1 to 9, further comprising repeating the method until possible combinations of the second subset of attributes of the of set of attributes are selected.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method for enabling a processing of a dataset of records having a set of attributes, the method comprising:
   selecting a first attribute of the set of attributes and a subset of one or more second attributes of the set of attributes;
   determining from the dataset distinct values of the subset of second attributes;
   for each distinct value of the determined distinct values:
      identifying records of the dataset that have said each distinct value, and forming a group of words from values of the first attribute of the identified records;
      identifying distinct word sequences in the formed groups, each word sequence comprising one or more words, and determining a level of presence of each word sequence of the word sequences in each of the formed groups;
   storing at least part of the levels of presence; and
   processing an incomplete dataset comprising one or more incomplete records, the processing comprising:
      identifying a record of the incomplete dataset having a certain value of the first attribute and having no values for one or more attributes, called missing attributes, of the subset of second attributes;
      generating a word sequence from the certain value; and
      identifying levels of presence corresponding to the generated word sequence.

2. The method of claim 1, further comprising:
   receiving a matching request, the matching request comprising a record having a certain value of the first attribute and having or not having values for one or more attributes, called hereinafter missing attributes, of the subset of second attributes;
   generating a word sequence from the certain value;
   identifying the levels of presence corresponding to the generated word sequence;
   determining the group associated with the highest identified level of presence;
   using the distinct value of the subset of second attributes associated with the determined group for determining missing values of the missing attributes;
   associating the missing values with the received record, resulting in a modified record;
   comparing the modified record with records of the dataset; and
   providing the result of the comparison.

3. The method of claim 2, wherein the comparing of the modified record with a record of the records of the dataset comprises assigning a contribution weight to the generated word sequence and comparing the value of the first attribute of the record with the certain value, providing the comparison result based on the contribution weight.

4. The method of claim 2, wherein the received record is a structured or an unstructured record.

5. The method of claim 1, wherein processing the incomplete dataset comprising one or more incomplete records further comprises:
   determining the group associated with the highest identified level of presence; and
   using the distinct value of the subset of second attributes associated with the determined group for determining the values of the missing attributes.

6. The method of claim 1, wherein the level of presence of the word sequence, w, in each group, d, of the formed groups, D, is a weighted fraction tf(w,d) * idf(w,D) of words of the group d, wherein $$tf(w, d) = \frac{\text{number of occurences in } w \text{ in } d}{\text{number of word sequences in } d},$$

$$\text{and } idf(w, D) = \log\left(\frac{\text{number of groups in } D}{\text{number of groups in containing } w}\right).$$

7. The method of claim 1, wherein forming the group of words comprises: creating a document, and concatenating the values of the first attribute of the identified records in the document using a delimiter.

8. The method of claim 1, wherein the storing further comprises: providing a matrix of cells being arranged in columns and rows, each column in the matrix representing a respective group of the formed groups and each row in the matrix representing a distinct word sequence of the distinct word sequences, storing the levels of presence in respective cells of the matrix.

9. The method of claim 1, wherein the storage of the levels of presence comprises:
selecting levels of presence higher than a predefined threshold and storing the selected levels of presence.

10. The method of claim 1, further comprising repeating the method until all first attributes of the set of attributes are selected.

11. The method of claim 1, repeating the method until possible combinations of the second subset of attributes of the of set of attributes are selected.

12. A computer program product comprising a computer-readable storage medium having computer-readable program code embodied therewith, the computer-readable program code configured to implement a method for enabling a processing of a dataset of records having a set of attributes, the method comprising:
selecting a first attribute of the set of attributes and a subset of one or more second attributes of the set of attributes;
determining from the dataset distinct values of the subset of second attributes;
for each distinct value of the determined distinct values:
identifying records of the dataset that have said each distinct value, and forming a group of words from values of the first attribute of the identified records;
identifying distinct word sequences in the formed groups, each word sequence comprising one or more words, and determining a level of presence of each word sequence of the word sequences in each of the formed groups; and
storing at least part of the levels of presence;
receiving a matching request, the matching request comprising a record having a certain value of the first attribute and having or not having values for one or more attributes, called hereinafter missing attributes, of the subset of second attributes;
generating a word sequence from the certain value; and
identifying the levels of presence corresponding to the generated word sequence.

13. The computer program product of claim 12, wherein the method further comprises:
determining the group associated with the highest identified level of presence;
using the distinct value of the subset of second attributes associated with the determined group for determining missing values of the missing attributes;
associating the missing values with the received record, resulting in a modified record;
comparing the modified record with records of the dataset; and
providing the result of the comparison.

14. The computer program product of claim 13, wherein the comparing of the modified record with a record of the records of the dataset comprises assigning a contribution weight to the generated word sequence and comparing the value of the first attribute of the record with the certain value, providing the comparison result based on the contribution weight.

15. The computer program product of claim 13, wherein the received record is a structured or an unstructured record.

16. The computer program product of claim 12, wherein the method further comprises processing an incomplete dataset comprising one or more incomplete records, the processing comprising:
identifying a record of the incomplete dataset having a certain value of the first attribute and having no values for one or more attributes, called missing attributes, of the subset of second attributes;
generating a word sequence from the certain value;
identifying levels of presence corresponding to the generated word sequence;
determining the group associated with the highest identified level of presence; and
using the distinct value of the subset of second attributes associated with the determined group for determining the values of the missing attributes.

17. The computer program product of claim 12, wherein forming the group of words comprises: creating a document, and concatenating the values of the first attribute of the identified records in the document using a delimiter.

18. The computer program product of claim 12, wherein the storing further comprises: providing a matrix of cells being arranged in columns and rows, each column in the matrix representing a respective group of the formed groups and each row in the matrix representing a distinct word sequence of the distinct word sequences, storing the levels of presence in respective cells of the matrix.

19. The computer program product of claim 12, wherein the storage of the levels of presence comprises: selecting levels of presence higher than a predefined threshold and storing the selected levels of presence.

20. A computer system for enabling a processing of a dataset of records having a set of attributes, the computer system the computer system comprising a processor and memory to store instructions, wherein the instructions are executed by the processor to perform:
selecting a first attribute of the set of attributes and a subset of one or more second attributes of the set of attributes;
determining from the dataset distinct values of the subset of second attributes;
for each distinct value of the determined distinct values:
identifying records of the dataset that have said each distinct value, and forming a group of words from values of the first attribute of the identified records;
identifying distinct word sequences in the formed groups, each word sequence comprising one or more words, and determining a level of presence of each word sequence of the word sequences in each of the formed groups; and
storing at least part of the levels of presence;
receiving a matching request, the matching request comprising a record having a certain value of the first attribute and having or not having values for one or more attributes, called hereinafter missing attributes, of the subset of second attributes;

generating a word sequence from the certain value; and identifying the levels of presence corresponding to the generated word sequence.

\* \* \* \* \*